Figure 1:
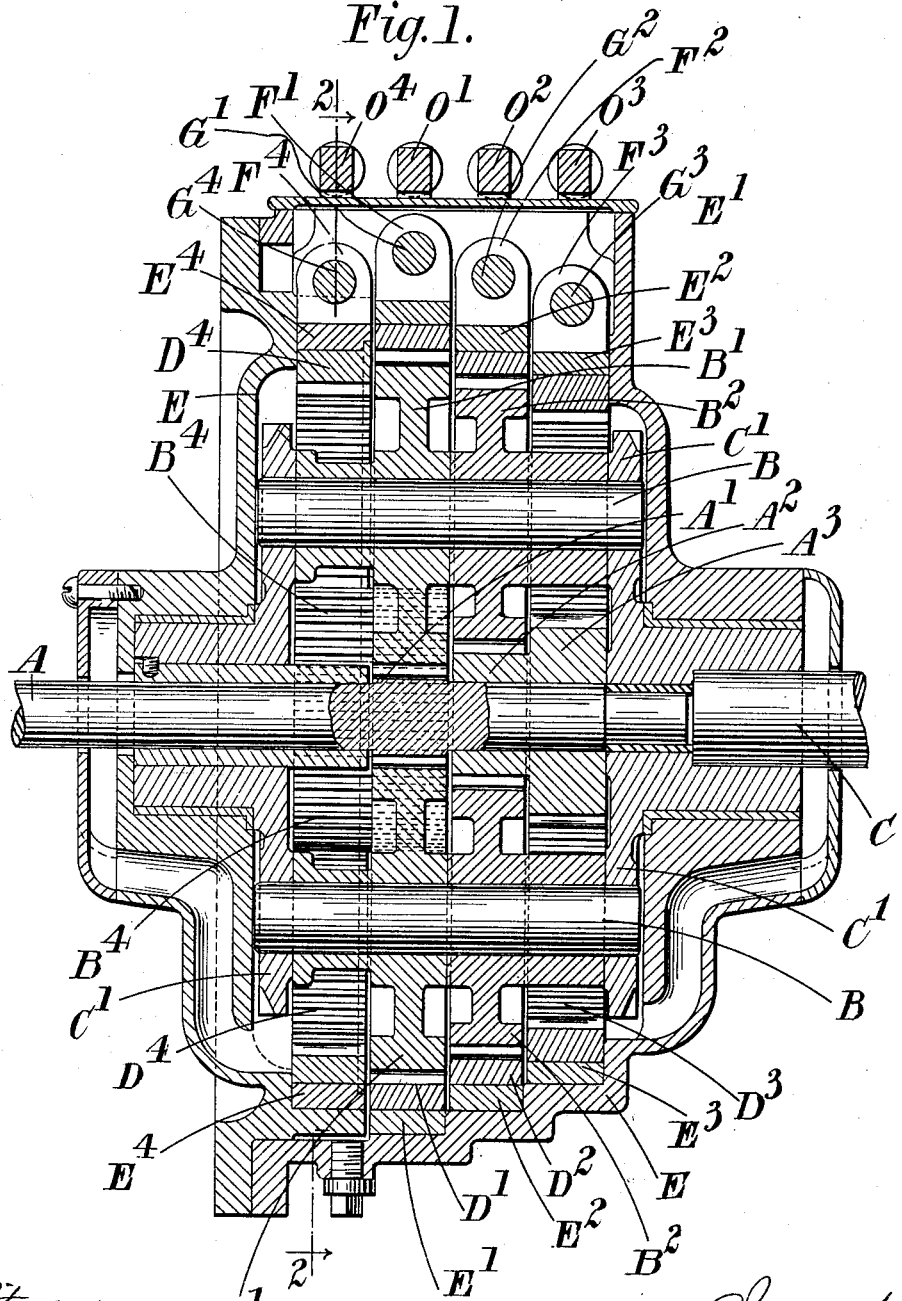

No. 763,654. PATENTED JUNE 28, 1904.
G. S. BAKER.
WHEEL GEARING FOR THE TRANSMISSION OF POWER.
APPLICATION FILED JAN. 20, 1903.
NO MODEL. 8 SHEETS—SHEET 1.

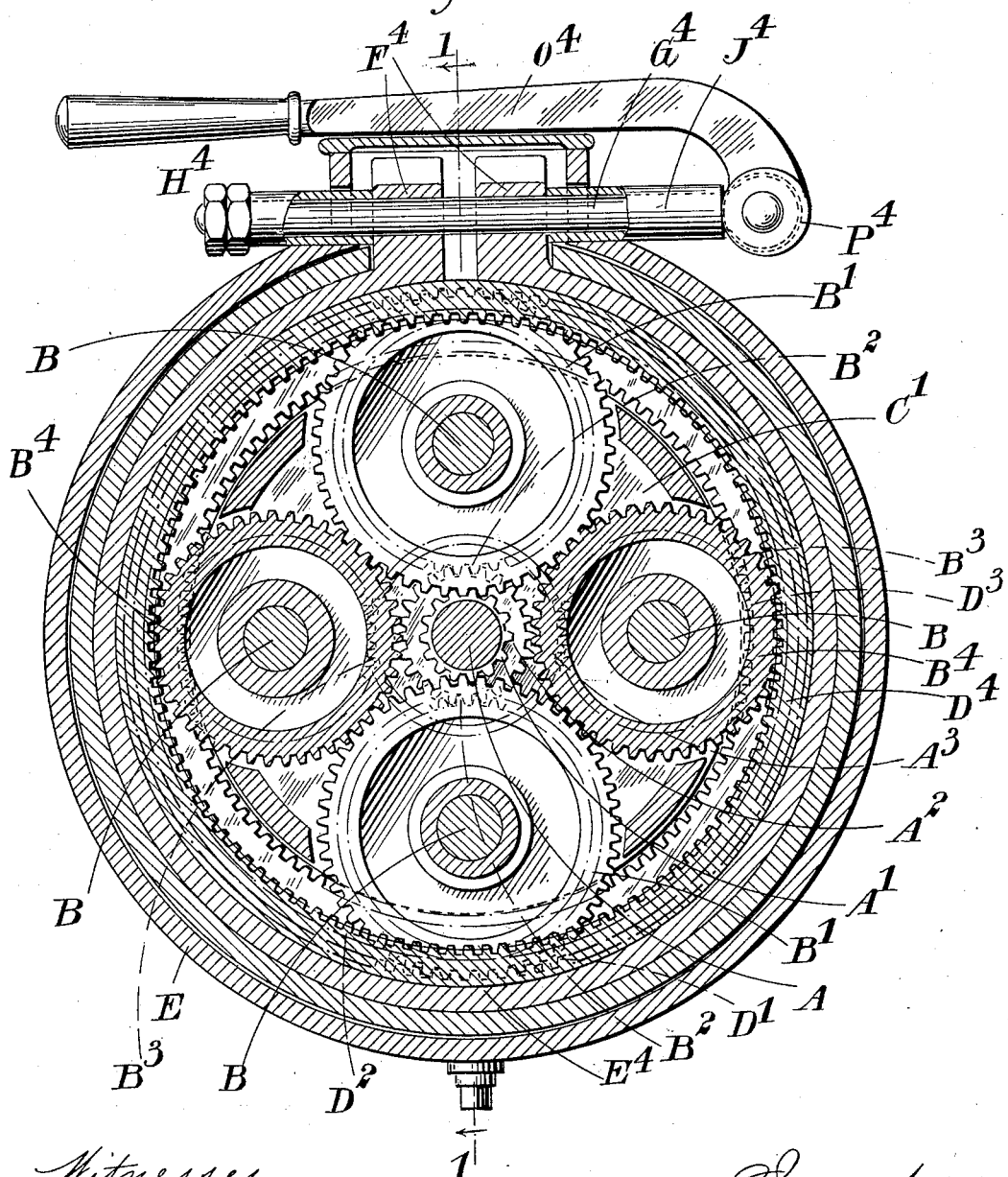

No. 763,654. PATENTED JUNE 28, 1904.
G. S. BAKER.
WHEEL GEARING FOR THE TRANSMISSION OF POWER.
APPLICATION FILED JAN. 20, 1903.
NO MODEL. 8 SHEETS—SHEET 3.
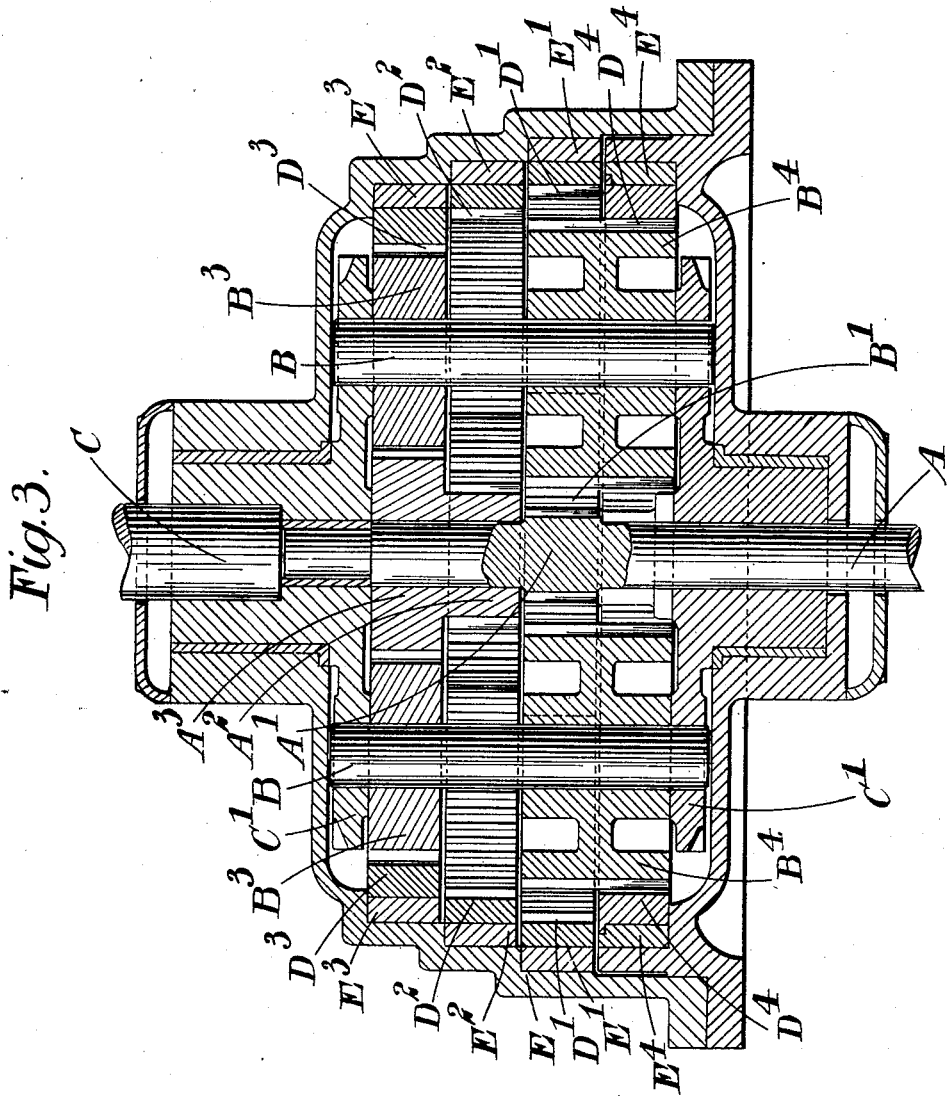

No. 763,654. PATENTED JUNE 28, 1904.
G. S. BAKER.
WHEEL GEARING FOR THE TRANSMISSION OF POWER.
APPLICATION FILED JAN. 20, 1903.
NO MODEL. 8 SHEETS—SHEET 4.
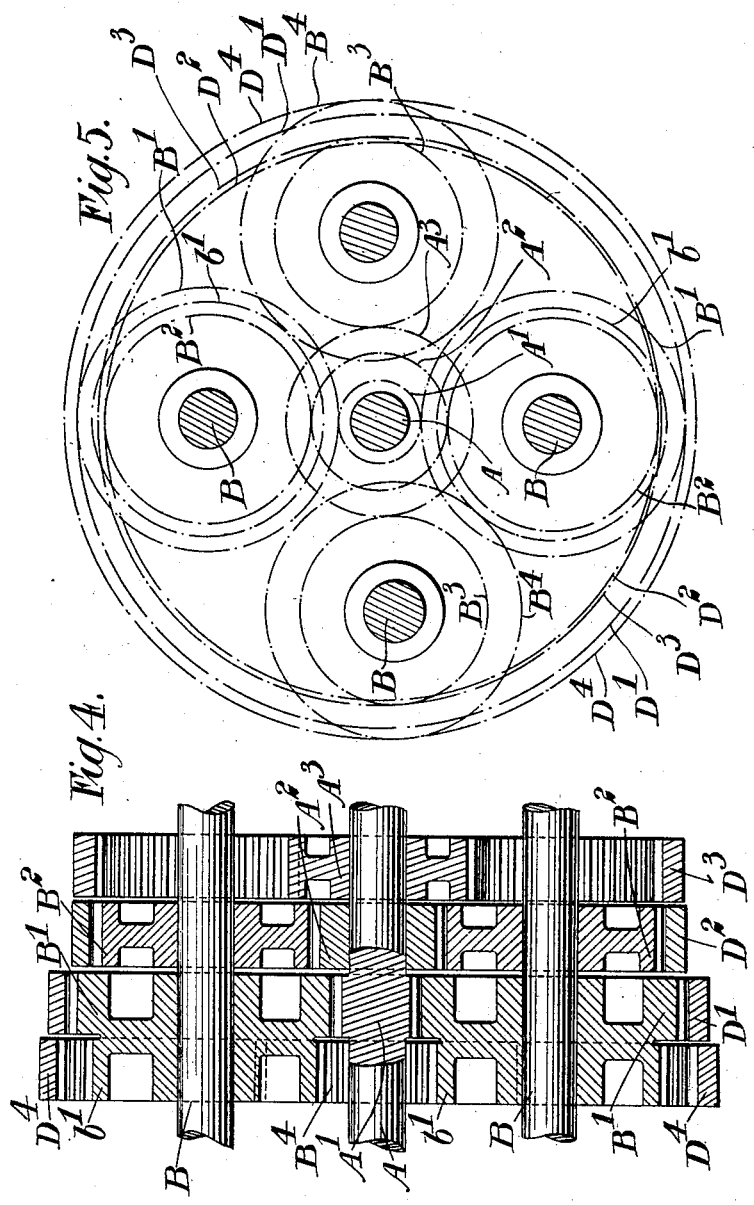

No. 763,654. PATENTED JUNE 28, 1904.
G. S. BAKER.
WHEEL GEARING FOR THE TRANSMISSION OF POWER.
APPLICATION FILED JAN. 20, 1903.
NO MODEL. 8 SHEETS—SHEET 5.
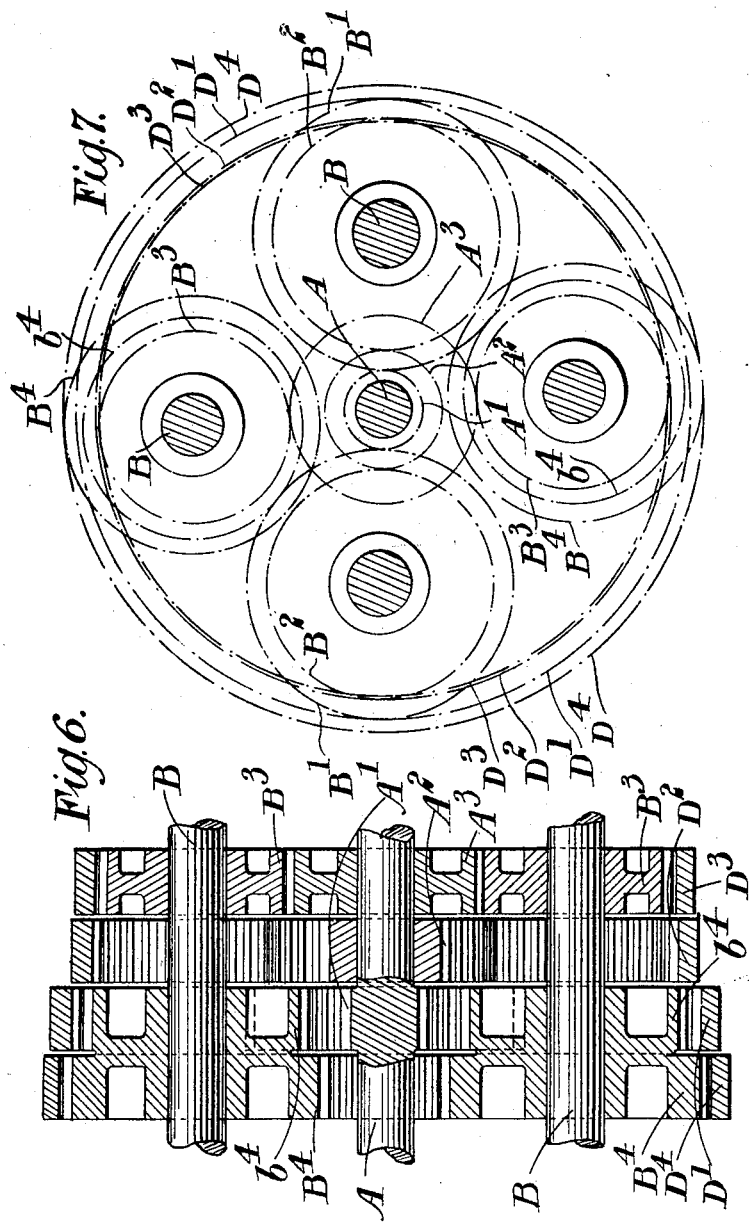

No. 763,654. PATENTED JUNE 28, 1904.
G. S. BAKER.
WHEEL GEARING FOR THE TRANSMISSION OF POWER.
APPLICATION FILED JAN. 20, 1903.
NO MODEL. 8 SHEETS—SHEET 6.
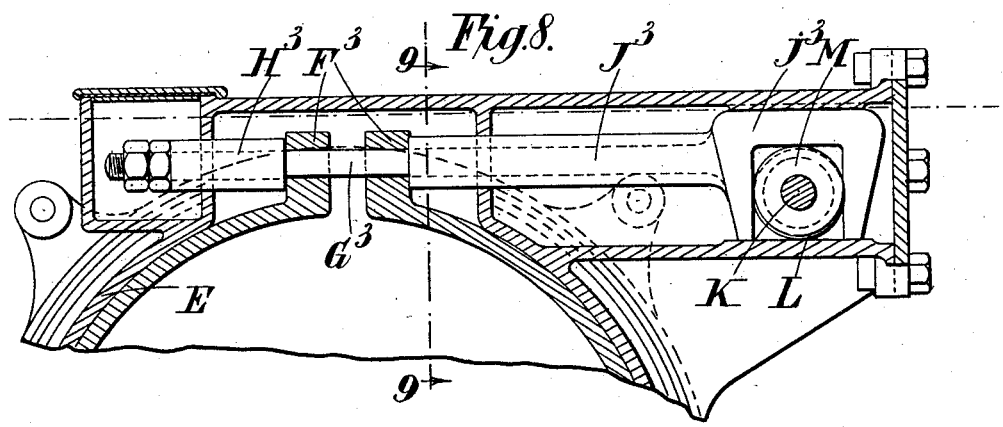
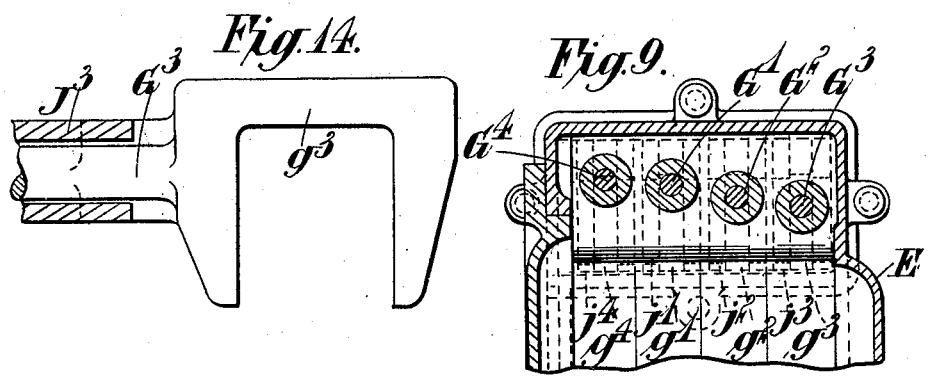
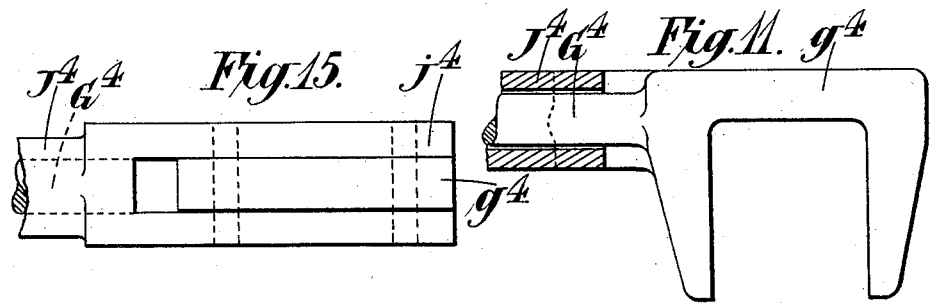
Witnesses:
Inventor
George S. Baker
By Wm. E. Poulter,
Attorney

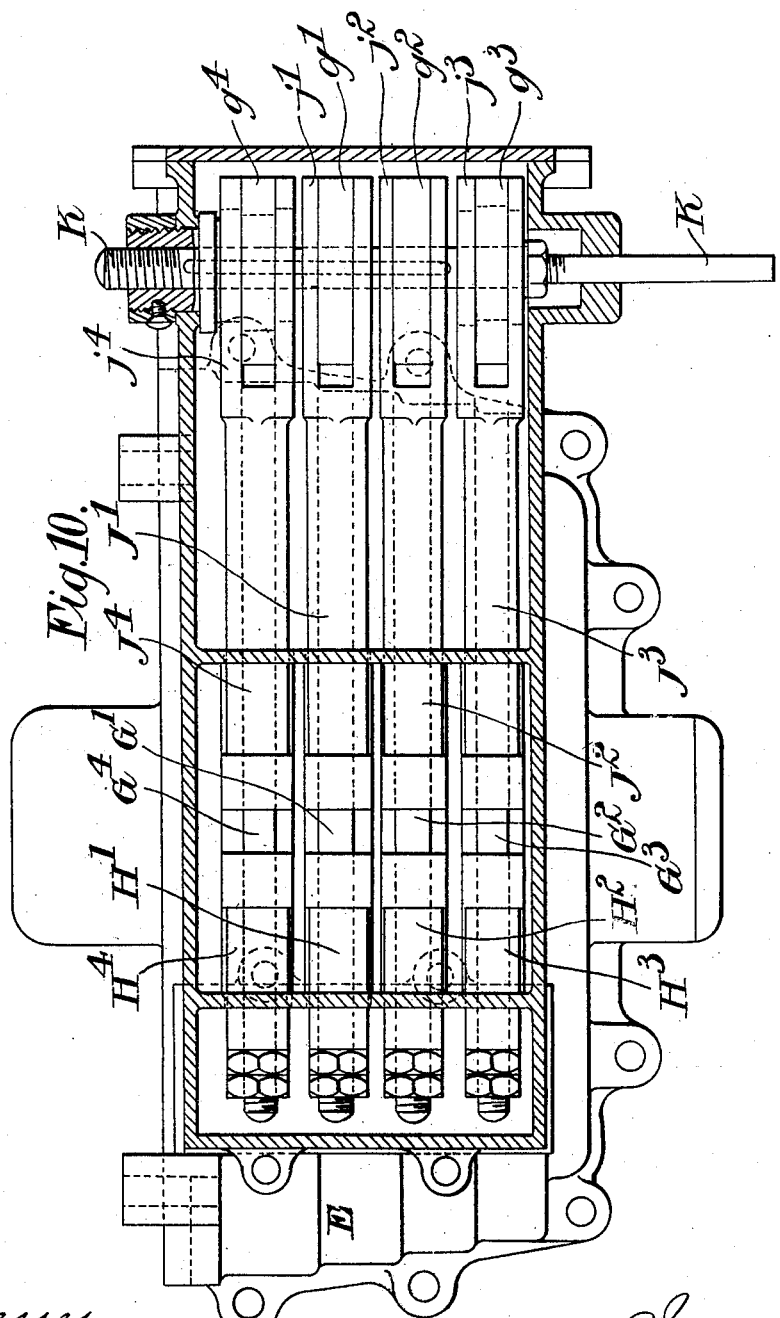

No. 763,654. PATENTED JUNE 28, 1904.
G. S. BAKER.
WHEEL GEARING FOR THE TRANSMISSION OF POWER.
APPLICATION FILED JAN. 20, 1903.
NO MODEL. 8 SHEETS—SHEET 8.
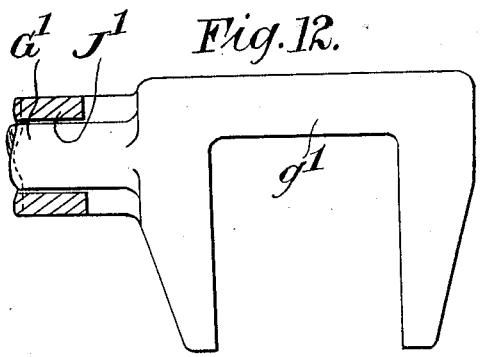
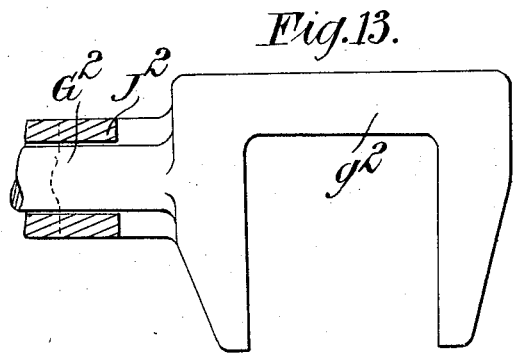
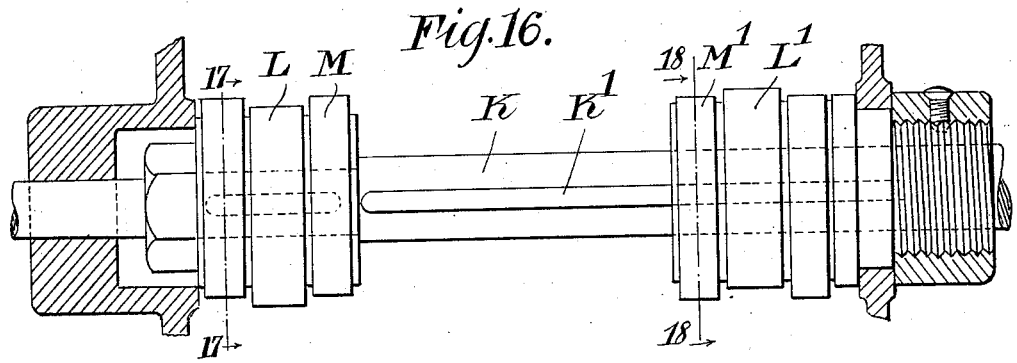
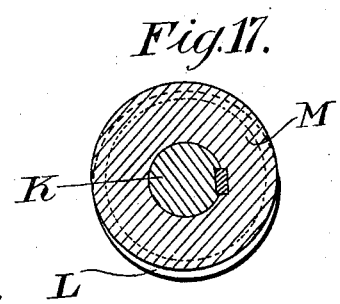
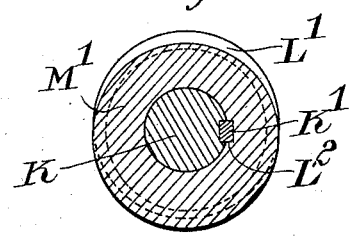

No. 763,654. Patented June 28, 1904.

UNITED STATES PATENT OFFICE.

GEORGE SAMUEL BAKER, OF LONDON, ENGLAND.

WHEEL-GEARING FOR THE TRANSMISSION OF POWER.

SPECIFICATION forming part of Letters Patent No. 763,654, dated June 28, 1904.

Application filed January 20, 1903. Serial No. 139,750. (No model.)

*To all whom it may concern:*

Be it known that I, GEORGE SAMUEL BAKER, a subject of the King of England, residing at London, England, have invented certain new and useful Improvements in or Relating to Wheel-Gearing for the Transmission of Power, of which the following is a specification.

The present invention relates to improvements in wheel-gearing for the transmission of power, one object being to provide a gear by means of which power may be transmitted from a driving to a driven shaft at any one of several speeds and by which the driven shaft may be caused to rotate in the opposite direction from the driving-shaft.

Another object of this invention is to provide suitable mechanism for altering the speed or reversing the rotation of the driven shaft.

According to this invention the gear comprises a driving-shaft, a driven shaft, a plurality of driving-pinions of different diameters on the driving-shaft, a plurality of planet-pinions of different diameters engaging, respectively, with the driving-pinions and rotatably mounted on spindles carried in a support positively connected with the driven shaft, an intermediate pinion engaging with one planet-pinion and rotatably mounted on a spindle in said support, a plurality of internally-tooted rotatable rings engaging, respectively, with the planet-pinions and with the intermediate pinion, and a plurality of contractible band-brakes respectively encircling the rotatable rings.

According to a preferred form of the gear each planet-pinion of the end epicyclic train comprises two portions of different diameters, one of which portions engages with the appropriated internally-toothed ring and the other of which engages with the intermediate pinion.

The mechanism for tightening the band-brakes comprises lugs on the band-brakes, a bolt passing through the lugs of each band-brake and engaging the outside of one lug, a sliding sleeve on each bolt engaging the other lug and a rotatable eccentric coöperating with the bolt and sleeve to tighten and slacken the band-brake. In a preferred form each bolt and sleeve is provided with a yoke, and one cam mechanism on a shaft is adapted to slide into operative contact with the yokes appropriated to any of the forward driving-trains and to operate when the cam-shaft is turned in one direction, while another cam mechanism remains in contact with the yokes appropriated to the reversing-train and operates when the cam-shaft is turned in the opposite direction.

In the accompanying drawings, Figure 1 is a central longitudinal section of a speed-gear constructed in accordance with one method of carrying out this invention. Fig. 2 is a transverse section of the same on the line 2 2 of Fig. 1. Fig. 3 is a horizontal central section of the same. Fig. 4 is a diagram in central longitudinal section showing a preferred form of the reversing mechanism. Fig. 5 is a diagram in end view of the same. Fig. 6 is a diagram in central longitudinal section showing an alternative form of the reversing mechanism. Fig. 7 is a diagram in end view of the same. Fig. 8 is a transverse section showing the brake-locking mechanism. Fig. 9 is a longitudinal section of the same. Fig. 10 is a plan of the same with the top of the casing removed. Figs. 11, 12, 13, and 14 are side elevations of the yokes of the separate bolts and sleeves corresponding to the reverse and several forward driving-trains, respectively. Fig. 15 is a plan of the yokes of the reversing-gear. Fig. 16 is a plan view of the cam-shaft, showing the forward and reversing cams. Fig. 17 is a transverse section of the sliding cam on the line 17 17 of Fig. 16, and Fig. 18 is a transverse section of the reversing cam on the line 18 18 of Fig. 16.

Like letters indicate like parts throughout the drawings.

Referring to Figs. 1 to 3, a driving-shaft A, which is conveniently a high-speed shaft, has upon it three driving-pinions $A'$ $A^2$ $A^3$ of different (increasing) diameters. Each driving-pinion gears with one or more, preferably two, planet-pinions $B'$ $B^2$ $B^3$ of different (decreasing) diameters, disposed about the driving-shaft and rotatably mounted on spindles B, carried in a frame $C'$, rotatable concentrically with the driving-shaft A and positively connected with the driven shaft C. Encircling and gearing with each set of planet-pinions is an internally-toothed rotatable ring D' D² D³, which can be held stationary by means of a band-brake E' E² E³, supported in a suitable casing E.

In addition to the epicyclic gears above described means are employed to impart reversed motion to the driven shaft. One planet-pinion, B', of the end epicyclic train engages with an intermediate pinion B⁴, which in Fig. 1 is a long pinion and which is mounted on a spindle B, carried by the frame C', fixed to the driven shaft C. The intermediate pinion B⁴ also gears with an internally-toothed rotatable ring D⁴, which can be locked by means of a band-brake E⁴. As shown in the drawings, the intermediate pinions are journaled on the same spindles as the planet-pinions of the train at the opposite end in order to balance the gear.

The operation of the gear is as follows: If any ring—say D'—be locked, the corresponding planet-pinion B' will run round on the fixed rack and carry with it the frame C' and the driven shaft C, and the speed of the driven shaft will depend upon the ring, which is stationary. When the ring D⁴ of the reversing-gear is locked, the rotation is transmitted from the driving-pinion A', through the planet-pinion B', to the intermediate pinion B⁴, which runs round on the fixed rack D⁴ in a reversed direction and transmits its motion of translation to the driven shaft C through the frame C'.

Referring to Figs. 4 and 5, each planet-pinion B' of the end epicyclic train is provided with a projecting toothed portion b' of smaller diameter, which engages with the intermediate pinion B⁴, which in this case is short. The intermediate pinions B⁴ and the corresponding ring D⁴ may be of any desired diameter.

Referring to Figs. 6 and 7, the planet-pinion B' is not compound; but the intermediate pinion B⁴ has a projecting pinion b⁴, which engages with the planet-pinion B', while the other portion, B⁴, gears with the internally-toothed rotatable ring D⁴.

Referring to Figs. 8 to 18, each band-brake consists of a split metal ring E' E² E³ E⁴, having two lugs F' F² F³ F⁴ at the free ends. A rod G' G² G³ G⁴ passes through holes in lugs F' to F⁴ in the ring and is provided with a nut or collar H' H² H³ H⁴, engaging with one lug, and carries a sliding sleeve J' J² J³ J⁴, which engages the other lug. Each bolt G' to G⁴ is provided with a yoke $g'$ $g^2$ $g^3$ $g^4$, and each sleeve J' to J⁴ has a corresponding yoke $j''$ $j^2$ $j^3$ $j^4$, the openings in the yokes being in line. Through these openings passes a rotatable cam-shaft K, on which is fixed a tightening device comprising an eccentric disk L to engage the bolt-yoke $g'$ and one or more disks M to engage the sleeve-yokes $j''$. The shaft is arranged to be shifted to bring the tightening device L M into operative contact with any desired set of yokes. A second tightening device, comprising an eccentric disk L', whose eccentricity is opposed to that of the disk L and disks M' for the sleeve-yokes, is caused to rotate with the cam-shaft K by a feather K' engaging a slot L² in the disks L' M', but is retained in operative contact with the yokes $g^4$ $j^4$, appropriated to the reversing-gear, by shoulders M² in contact with the casing E.

The operation of the locking mechanism is as follows: Supposing that the shaft is shifted to bring the disks L M into contact with the yokes $g'$ $j''$, while the disks L' M' remain in the yokes $g^4$ $j^4$. When the shaft K is turned in one direction, the eccentric disk L will pull the bolt G' out, while the disks M hold the sleeve J' in and the band-brake E' will be tightened. At the same time the turning of the disks L' M' will cause the bolt G⁴ to slide through the lugs F⁴ and the band-brake E⁴ will not be tightened; but if the shaft K be turned in the opposite direction the eccentric disk L' will pull the bolt G⁴ out, and the disks M' will hold the sleeve J⁴ in, and the band-brake E⁴ will be tightened, while the bolt G' will simultaneously be pushed through the lugs F' a little way and the band-brake E' will remain slack. Thus by moving the disks L M opposite to any one set of the yokes and by turning the shaft K in one direction the corresponding band-brake can be locked and the corresponding epicyclic train will come into play, while if the shaft in any position be turned in the opposite direction the reversing-gear will operate.

If desired, the shaft K may be longitudinally immovable and the disks L M may move thereon.

If the gear is used on a fixed machine, each band-brake may be provided with a separate tightening-handle O' O² O³ O⁴, pivoted to the bolt and having an eccentric projection, such as P⁴, engaging the sleeve, such as J⁴, as illustrated in Figs. 1 and 2.

If in a convenient position, the shaft may simply be turned by a hand-lever; but in the case of a motor-vehicle the shaft is operated from a hand-lever by the side of the driving-seat by means of beveled pinions or other suitable mechanism.

What I claim as my invention, and desire to secure by Letters Patent, is—

1. In a speed-gear the combination of a driving-shaft, a driven shaft, a plurality of driving-pinions of different diameters on the driving-shaft, a plurality of planet-pinions engaging respectively with the driving-pinions, an intermediate pinion engaging one planet-pinion, a plurality of internally-toothed rotatable rings engaging respectively with the planet and intermediate pinions, means for transmitting the motion of translation of the planet and intermediate pinions to the driven shaft and means for holding each rotatable ring stationary.

2. In a speed-gear the combination of a driving-shaft, a driven shaft, a plurality of driving-pinions of different diameters on the driving-shaft, a plurality of planet-pinions engaging respectively with the driving-pinions, a projecting toothed portion on the end planet-pinion, an intermediate pinion engaging with the projecting toothed portion, a plurality of internally-toothed rotatable rings engaging respectively with the planet and intermediate pinions, means for transmitting the motion of translation of the planet and intermediate pinions to the driven shaft and means for holding each rotatable ring stationary.

3. In a speed-gear the combination of a driving-shaft, a driven shaft, a rotatable cage positively connected with the driven shaft, a plurality of spindles in the cage, a plurality of driving-pinions of different diameters on the driving-shaft, a plurality of planet-pinions of different diameters engaging respectively with the driving-pinions and rotatably mounted on spindles, a projecting toothed portion on the end planet-pinion, an intermediate pinion engaging the projecting portion and rotatably mounted on a spindle, a plurality of internally-toothed rotatable rings engaging respectively with the planet and intermediate pinions, a plurality of band-brakes respectively encircling the rotatable rings and means for tightening each band-brake.

4. In a speed-gear the combination of a driving-shaft, a driven shaft, a rotatable cage positively connected with the driven shaft, a plurality of spindles in the cage, a plurality of driving-pinions of different diameters on the driving-shaft, a plurality of planet-pinions of different diameters engaging respectively with the driving-pinions and rotatably mounted on spindles, a projecting toothed portion on the end planet-pinion, an intermediate pinion engaging the projecting portion and rotatably mounted on the same spindle as the smallest planet-pinion, a plurality of internally-toothed rotatable rings engaging respectively with the planet and intermediate pinions, a plurality of band-brakes respectively encircling the rotatable rings and means for tightening each band-brake.

5. In a speed-gear the combination of a driving-shaft, a driven shaft, a plurality of driving-pinions of different diameters on the driving-shaft, a plurality of planet-pinions of different diameters engaging respectively with the driving-pinions, a plurality of internally-toothed rotatable rings engaging respectively with the planet-pinions, means for transmitting the motion of translation of the planet-pinions to the driven shaft, a plurality of band-brakes respectively encircling the rings, lugs on the free ends of each band-brake, a bolt and sleeve thereon engaging the two lugs of each brake, a cam device, and means for actuating the bolt and sleeve of any brake by said cam device.

6. In a speed-gear the combination of a driving-shaft, a driven shaft, a plurality of driving-pinions of different diameters on the driving-shaft, a plurality of planet-pinions of different diameters engaging respectively with the driving-pinions, a plurality of internally-toothed rotatable rings engaging respectively with the planet-pinions, means for transmitting the motion of translation of the planet-pinions to the driven shaft, a plurality of band-brakes respectively encircling the rings, lugs on the free ends of each band-brake, a bolt and sleeve thereon engaging the two lugs of each brake, a yoke on each bolt, a yoke on each sleeve, a shaft passing through the yokes, a cam on the shaft comprising an eccentric disk appropriated to the bolt-yoke and another disk appropriated to the sleeve-yoke and means for turning the shaft.

7. In a speed-gear the combination of a driving-shaft, a driven shaft, a plurality of driving-pinions of different diameters on the driving-shaft, a plurality of planet-pinions of different diameters engaging respectively with the driving-pinions, a plurality of internally-toothed rotatable rings engaging respectively with the planet-pinions, means for transmitting the motion of translation of the planet-pinions to the driven shaft, a plurality of band-brakes respectively encircling the rings, lugs on the free ends of each band-brake, a bolt and sleeve thereon engaging the two lugs of each brake, a yoke on each bolt, a yoke on each sleeve, a shaft passing through the yokes, a cam on the shaft comprising an eccentric disk appropriated to the bolt-yoke and another disk appropriated to the sleeve-yoke, means for shifting the cam opposite to any set of yokes, and means for turning the shaft.

8. In a speed-gear the combination of a driving-shaft, a driven shaft, a plurality of driving-pinions of different diameters on the driving-shaft, a plurality of planet-pinions engaging respectively with the driving-pinions, an intermediate pinion engaging with one planet-pinion, a plurality of internally-toothed rotatable rings engaging respectively with the planet and intermediate pinions, means for transmitting the motion of translation of the planet and intermediate pinions to the driven shaft, a plurality of band-brakes encircling the rings, lugs on the free ends of each band-brake, a bolt and sleeve thereon engaging the two lugs of each brake, a cam device for actuating the bolt and sleeve of any forward brake, means for bringing the cam device opposite the bolt of any forward driving-gear, another opposite cam device always in operative contact with the bolt of the reversing-gear, means for operating the forward bolt when the shaft is turned in one direction and means for operating the reverse bolt when the shaft is turned in the other direction.

9. In a speed-gear the combination of a driving-shaft, a driven shaft, a plurality of driving-pinions of different diameters on the driving-shaft, a plurality of planet-pinions engaging respectively with the driving-pinions, an intermediate pinion engaging with one planet-pinion, a plurality of internally-toothed, rotatable rings engaging respectively with the planet and intermediate pinions, means for transmitting the motion of translation of the planet and intermediate pinions to the driven shaft, a plurality of band-brakes encircling the rings, lugs on the free ends of each band-brake, a bolt and sleeve thereon engaging the two lugs of each brake, a yoke on each bolt, a yoke on each sleeve, a shaft passing through the yokes, a cam on the shaft comprising an eccentric disk appropriated to the bolt-yoke and another disk appropriated to the sleeve-yoke, means for sliding the cam opposite to any set of yokes of the forward driving-trains, a second cam on the shaft of opposite eccentricity to the first cam comprising an eccentric disk appropriated to the bolt-yoke and another disk appropriated to the sleeve-yoke, means for holding the second cam in operative contact with the yokes of the reversing-gear and means for turning the cam-shaft in either direction.

In testimony whereof I have signed my name to this specification in the presence of two subscribing witnesses.

GEORGE SAMUEL BAKER.

Witnesses:
GEORGE G. TALMONATT,
WALTER J. SKERTEN.